Dec. 23, 1941.  W. C. HILL  2,266,756
AUTOMATIC EXPANSION VALVE
Filed July 19, 1937
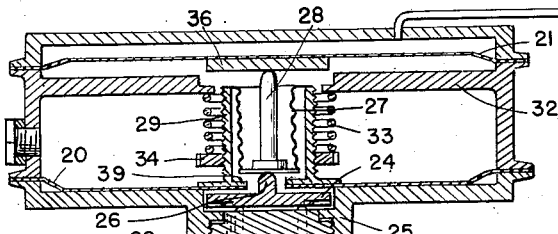
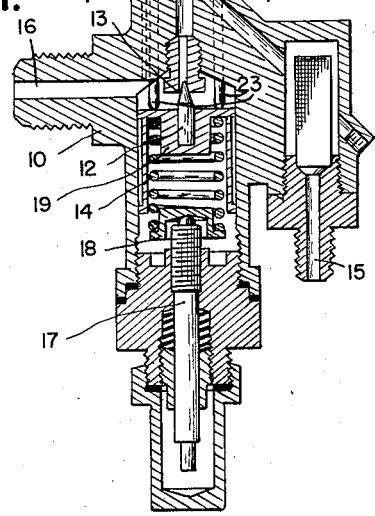
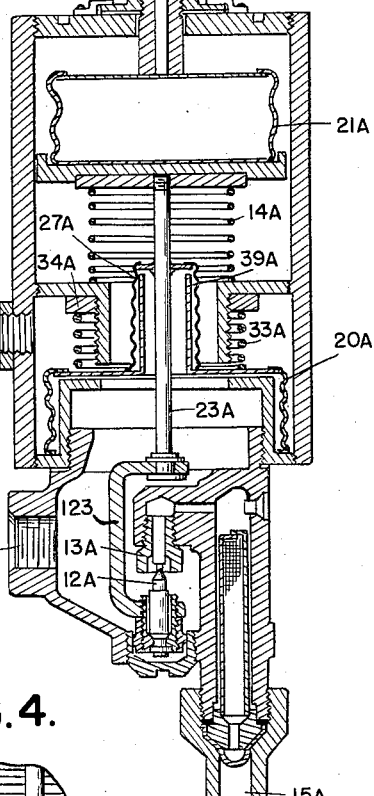
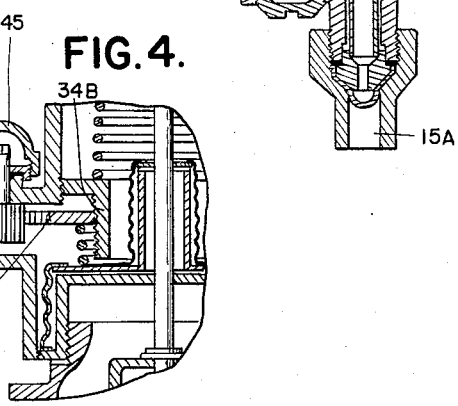
INVENTOR.
WILLIAM C. HILL
BY
ATTORNEYS Patented Dec. 23, 1941

2,266,756

UNITED STATES PATENT OFFICE 2,266,756

AUTOMATIC EXPANSION VALVE

William C. Hill, Detroit, Mich.

Application July 19, 1937, Serial No. 154,381

3 Claims. (Cl. 137—153)

This invention relates to automatic expansion valves for refrigerating apparatus, and is especially concerned with the incorporation in such valves of improved controlling means so arranged that although valve operation is normally influenced by relative pressure variations in the portion of the system to which it is connected, the valve may at desired times be rendered inoperative and held shut, regardless of such pressure variances, in response to one or more overcontrolling factors, such as temperature and/or pressure conditions, either in a served zone or in any desired portion of the refrigerating system. This invention constitutes an improvement upon the disclosures of my Patent No. 1,978,709, issued October 30, 1934, and my previously filed copending application Serial No. 138,118, filed April 21, 1937.

In the drawing:

Figure 1 is a somewhat simplified substantially diametric cross-sectional view of an expansion valve incorporating the principles of this invention.

Figure 2 is a detailed sectional view taken substantially on the line 2—2 of Figure 1 and looking in the direction of the arrows.

Figure 3 is a view similar to Figure 1 of a somewhat modified embodiment.

Figure 4 is a fragmentary detailed view of a modified adjusting means.

In the drawing, Figure 1 shows a valve construction whose major parts, other than the control assembly, are of a well known and commercially available design. It will be appreciated that such parts, including the valve body 10, the valve member 12 and the mechanical portions other than those carried by the control head 25, may take any of various forms. The valve is shown as urged against its seat 13 by a spring 14, the inlet being designated 15 and the outlet 16. The outlet may of course be connected directly to the evaporator (unshown). An adjusting screw 17 acting through a thrust plate 18 is provided to vary the effective tension of spring 14. At its other end the spring transmits its force to the valve through a second thrust plate 19.

The control head 25 will be seen to comprise a substantially cylindrical casing threaded or otherwise secured upon the end of the valve body. In the control head are a pair of spaced diaphragms 20, 21. The upper diaphragm 21 is thermostatically controlled, the chamber above the diaphragm being subjected to pressure variances resulting from expansion and contraction of thermostatic fluid in the bulb 30 and connecting tube 31. The lower diaphragm, 20, is subjected to evaporator pressure, the space beneath such lower diaphragm being connected to the outlet 16 by a passage 22 in the valve body. Thrust rods 23 provide mechanical connection between the diaphragm plate 24 and the thrust plate 19 of the valve, whereby when the valve is in operation a fall of evaporator pressure, acting on the under side of diaphragm 20, tends to open the valve, and vice versa, although pressure variances cannot always have this effect, as will presently appear.

Beneath the central portion of diaphragm 20, but unattached to the diaphragm, is a plate 24 which serves as a bearing for the upper ends of rods 23. The diaphragm 20 cannot act directly on plate 24 to open the valve, however. An aperture is formed in the center of diaphragm 20, upwardly through which projects an actuating stem 26 carried by plate 24, the upper end of such stem being engageable by the lower end of a small, flexible bellows-diaphragm 27. The bellows 27 constitutes a flexible central section of diaphragm 20, and is actuable, through a thrust bar 28, by upper diaphragm 21. Full downward movement of diaphragm 20 is insufficient to allow it to bear against the top of plate 24 and open the valve, but if bellows 27 is distended sufficiently by thrust bar 28 and diaphragm 21, the valve may not only be opened through the action upon stem 26, but a modifying effect is also induced by diaphragm 20. When fully distended, the end plate of bellows 27 may seat against an inwardly projecting flange 39 carried by its supporting sleeve 29, at which time the bellows and diaphragm 20 may move as a unit.

The bellows supporting element comprises a cylindrical sleeve 29 secured to the top of diaphragm 20 by means of its bottom flange portion 39, which, as previously stated, extends inwardly far enough to form a seat for the end of the bellows, the upper end of which is of course sealed to the top of the sleeve. Diaphragm 20 is urged downwardly by a spring 33, which acts at its lower end against an adjustable abutment nut 34 carried by the bellows-supporting sleeve 29, while at its upper end the spring bears against a partition 32 which divides the casing into upper and lower sections which house diaphragms 21 and 20. Partition 32 also serves as a stop to limit downward movement of diaphragm 21. Diaphragm 21 centrally carries upon its under side a bearing plate 36 for the rod 28.

Bulb 30 may be subjected either to evaporator temperature or to served zone temperature, although preferably it is attached to the evaporator near its outlet. If such temperature is high enough to call for operation of the system, the expansion of fluid in the chamber above diaphragm 21, will, by urging the plate 24 downwardly, tend to open the valve, although the valve may be prevented from opening by diaphragm 20, if the evaporator pressure is high enough to maintain that diaphragm raised with sufficient force. With the valve open, variation of evaporator pressure acting on the under side of the diaphragm 20, tends to regulate the orifice, and may also, overcoming the pressure of the thermostat, act to close the valve, but it will be apparent that a fall of evaporator pressure cannot open the valve if the pressure of the thermostatic fluid is below a certain minimum necessary to enable the transmission of the driving force to the two diaphragms, through portions 26, 27 and 28.

In the somewhat modified construction shown in Figure 3, the valve 12A is also urged toward closed position by a spring as 14A, acting against inlet pressure, the inlet being designated 15A and the outlet 16A. The effort of closing spring 14A, as well as the modifying influences of bellows diaphragms 20A—21A will be seen to be transmitted to the valve through a stem 23A and an extension thereof designated 123 shaped to clear the valve seat 13A, the valve being adjustably carried by the extension 123. The bellows diaphragm 20A is subjected to evaporator pressure, since it opens directly into the valve chamber upon the outlet side. A central opening in the diaphragm through which the stem 23A projects freely, together with a flexible central extension bellows 27A sealed to the edge of the opening, prevents direct transmission of the drive of the diaphragm 20A to the valve, and so prevents opening of the valve unless bellows 21A is expanded under the influence of the thermostatic fluid contained in bulb 30A. A stop portion 39A limits independent actuation of the valve toward open position by bellows 21A, enabling the valve to be held closed by evaporator pressure, at certain times, against the effort of bellows 21A, and transmitting to the valve the closing effort of bellows 20A. When bellows 21A is expanded, the anchoring plate for the flexible bellows section 27A is driven against stop portion 39A, whereafter bellows 20A may exert its influence upon the valve action. A spring 33A tends to assist the opening effort of the diaphragm 20A, bearing downwardly on the top thereof, and is adjustable in it effect by means of the stop nut 34A accessible through a removable plug 37A in the side of the casing.

In the somewhat modified construction shown in Figure 4, the spring adjusting means last described is provided with externally accessible manipulating means in the form of a shaft 40, squared to receive a wrench or other rotating means. The shaft extends into the casing where it carries a gear 41 meshing with cooperating gear teeth 42 formed on the periphery of adjusting nut 34B. Stuffing box 44 is provided for stem 40, and fixed seal is provided by a removable cap nut 45. Thus although in this embodiment as in Figure 3 the central chamber between the bellows 20A—21A is subjected neither to evaporator pressure nor thermostat pressure, such chamber may be sealed against undesirable entrance of moisture by such a modified adjusting means as shown in Figure 4.

Although in each of the selected embodiments disclosed the diaphragms are somewhat spaced from each other and the springs arranged between them, it will be apparent that this arrangement might easily be reversed, that is, the diaphragms arranged close together and the springs upon their outer or opposite sides.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In an expansion valve, in combination with a casing and a valve member movably mounted therein, means for controllingly actuating the valve member comprising a pair of independently movable diaphragms, one of said diaphragms defining a pressure chamber having a reaction portion fixed with respect to the casing, means operatively connecting said diaphragm to the valve member for movement therewith in both directions, a flexible portion movable to and from operative engagement with the other diaphragm, said flexible portion cooperating with a one-directional driving means for transmitting motion from said other diaphragm to the valve member in one direction only, said other diaphragm also defining a pressure chamber having a reaction portion fixed with respect to the casing and being movable to an inoperative position, whereby through a portion only of its travel said other diaphragm may oppose the effort of said first mentioned diaphragm.

2. In a pressure-responsive valve structure, in combination with a casing, a valve movable therein toward open and closed positions, a pair of flexible diaphragms, one movable with the valve in both directions and the other having a one-directional driving connection with the valve whereby it may move therewith in one direction corresponding to closing movement of the valve, and may move independently thereof in the other direction, a portion carried by said casing adapted to serve as a stop to limit movement of the last-mentioned diaphragm in the direction in which it is independently movable, a substantial proportion of the effective area of said last-mentioned diaphragm being movable into engagement with said stop portion and said portion being positioned to support said diaphragm against unwanted distortion.

3. In a pressure-responsive valve structure, in combination with a casing, a flexible diaphragm therein adapted to actuate a valve, a portion carried by said casing being adapted to serve as a stop to limit movement of the diaphragm, a substantial proportion of the effective area of said diaphragm being movable into engagement with said stop portion, said portion being positioned to support said diaphragm against unwanted distortion, one-directional driving means transmitting its driving effort through said another diaphragm, said other diaphragm having a relatively small, independently movable central section sealed with relation to the remainder thereof, said section being movable with said one-directional driving means and engageable and disengageable with respect to the remainder of the diaphragm to form a part of said one-directional driving means, said independently movable central section forming part of said connecting means for transmitting to the valve the force and resistance of said first-mentioned diaphragm, said diaphragms being arranged in substantially coaxial spaced relation, pressure chamber portions arranged upon opposite sides of said diaphragms, the pressure chamber portion of said other diaphragm communicating with the outlet side of said valve member, whereby a rise in pressure in the pressure chamber of said first-mentioned diaphragm tends to open the valve, and a fall in pressure in such chamber tends to close the valve, and whereby said other diaphragm may oppose opening movement of the valve but cannot prevent closure thereof.

WILLIAM C. HILL.